(12) United States Patent
Zitzmann

(10) Patent No.: US 10,647,150 B2
(45) Date of Patent: May 12, 2020

(54) REUSABLE WALL/CEILING MOUNTED THREE DIMENSIONAL STICKER AND METHOD THEREFOR

(71) Applicant: Deanna Zitzmann, Las Vegas, NV (US)

(72) Inventor: Deanna Zitzmann, Las Vegas, NV (US)

( * ) Notice: Subject to any disclaimer, the term of this patent is extended or adjusted under 35 U.S.C. 154(b) by 191 days.

(21) Appl. No.: 15/946,493

(22) Filed: Apr. 5, 2018

(65) Prior Publication Data
US 2018/0290486 A1  Oct. 11, 2018

Related U.S. Application Data

(60) Provisional application No. 62/482,869, filed on Apr. 7, 2017.

(51) Int. Cl.
| | | |
|---|---|---|
| B44F 7/00 | (2006.01) |
| B32B 5/02 | (2006.01) |
| F21V 33/00 | (2006.01) |
| H04R 3/00 | (2006.01) |
| H04R 1/02 | (2006.01) |
| B44C 1/10 | (2006.01) |
| B44C 3/02 | (2006.01) |
| B44F 1/00 | (2006.01) |
| G09B 19/00 | (2006.01) |
| G09B 1/00 | (2006.01) |
| F21W 121/00 | (2006.01) |

(52) U.S. Cl.
CPC .............. *B44F 7/00* (2013.01); *B32B 5/02* (2013.01); *B44C 1/105* (2013.01); *B44C 3/025* (2013.01); *B44F 1/00* (2013.01); *F21V 33/0028* (2013.01); *G09B 1/00* (2013.01); *G09B 19/00* (2013.01); *H04R 1/028* (2013.01); *H04R 3/00* (2013.01); *B32B 2451/00* (2013.01); *F21W 2121/00* (2013.01)

(58) Field of Classification Search
CPC ........................................................ B44F 7/00
USPC ........................................................... 428/99
See application file for complete search history.

(56) References Cited

U.S. PATENT DOCUMENTS

| | | | |
|---|---|---|---|
| 5,491,006 A | 2/1996 | Johnson et al. |
| 5,903,869 A | 5/1999 | Jacobson |
| 5,905,429 A | 5/1999 | Hornstein et al. |

(Continued)

FOREIGN PATENT DOCUMENTS

| | | |
|---|---|---|
| CN | 102332215 | 1/2012 |
| CN | 203560782 | 4/2014 |

(Continued)

*Primary Examiner* — Brent T O'Hern
(74) *Attorney, Agent, or Firm* — Weiss & Moy, P.C.; Jeffrey D. Moy

(57) ABSTRACT

A three-dimensional sticker has an adhering layer removably attaching the three-dimensional sticker to an object. A filler material is positioned on an interior surface of the adhering layer, the filler material forming a three-dimensional configuration. A recording device is positioned on the interior surface of the adhering layer allowing the three-dimensional sticker to play a pre-recorded message and record a new message. A cover layer is positioned over the interior surface of the adhering layer enclosing the filler material and the recording device between the interior surface of the adhering layer and the cover layer.

20 Claims, 4 Drawing Sheets

(56) References Cited

U.S. PATENT DOCUMENTS

| | | |
|---|---|---|
| 2008/0135326 A1 | 6/2008 | Louhsiao |
| 2013/0271968 A1 | 10/2013 | Wegrzyn |
| 2015/0341713 A1* | 11/2015 | Tsai ...................... H04R 1/028 381/150 |

FOREIGN PATENT DOCUMENTS

| | | |
|---|---|---|
| CN | 104900144 | 9/2015 |
| DE | 102007014111 | 9/2008 |

\* cited by examiner

REUSABLE WALL/CEILING MOUNTED THREE DIMENSIONAL STICKER AND METHOD THEREFOR

This patent application is related to U.S. Provisional Application No. 62/482,869 filed Apr. 7, 2017, entitled "A REUSABLE WALL/CEILING MOUNTED THREE DIMENSIONAL STICKER AND METHOD THEREFOR" in the name of the same inventor, and which is incorporated herein by reference in its entirety. The present patent application claims the benefit under 35 U.S.C § 119(e).

TECHNICAL FIELD

Technical Field

The present application in general relates to stickers, and more specifically, to a reusable three-dimensional sticker which may be mounted on a wall and/or ceiling and which has increased functionality as compared to current visual only stickers.

Background

A conventional sticker is a thin material with an adhesive layer. A surface of the thin material is generally printed with a pattern or other indicia. Conventional stickers are generally stuck on objects. For example, teachers may place stickers on a student's homework or test to indicate a good job. Some people may place stickers on the wall of their children's room as a way to decorate the room. However, conventional stickers generally have no additional functionality besides being decorative. Further, the adhesive used on many conventional stickers prevents the conventional stickers from being reused. In many conventional stickers the adhesive is so strong as to prevent the conventional sticker from being peeled off of the surface upon which the sticker is placed upon. Even if one is able to remove the sticker from the adhered to surface, a sticky residue generally remains on the surface.

Therefore, it would be desirable to provide an improved sticker. The improved sticker would be reusable and provide additional functionality than that of prior art stickers.

SUMMARY

In accordance with one embodiment, a three-dimensional sticker is disclosed. The three-dimensional sticker has an adhering layer removably attaching the three-dimensional sticker to an object. A filler material is positioned on an interior surface of the adhering layer, the filler material forming a three-dimensional configuration. A recording device is positioned on the interior surface of the adhering layer allowing the three-dimensional sticker to play a pre-recorded message and record a new message. A cover layer is positioned over the interior surface of the adhering layer enclosing the filler material and the recording device between the interior surface of the adhering layer and the cover layer.

In accordance with one embodiment, a three-dimensional sticker is disclosed. The three-dimensional sticker has an adhering layer removably attaching the three-dimensional sticker to an object. A filler material is positioned on an interior surface of the adhering layer, the filler material forming a three-dimensional configuration. A recording device is positioned on the interior surface of the adhering layer allowing the three-dimensional sticker to play a pre-recorded message and record a new message. A lighting device is positioned on the interior surface of the adhering layer. A cover layer is positioned over the interior surface of the adhering layer enclosing the filler material, the recording device and the lighting device between the interior surface of the adhering layer and the cover layer. A decorative layer is formed on the cover layer.

BRIEF DESCRIPTION OF THE DRAWINGS

The present application is further detailed with respect to the following drawings. These figures are not intended to limit the scope of the present invention but rather illustrate certain attributes thereof.

DESCRIPTION OF THE APPLICATION

Figure 1:
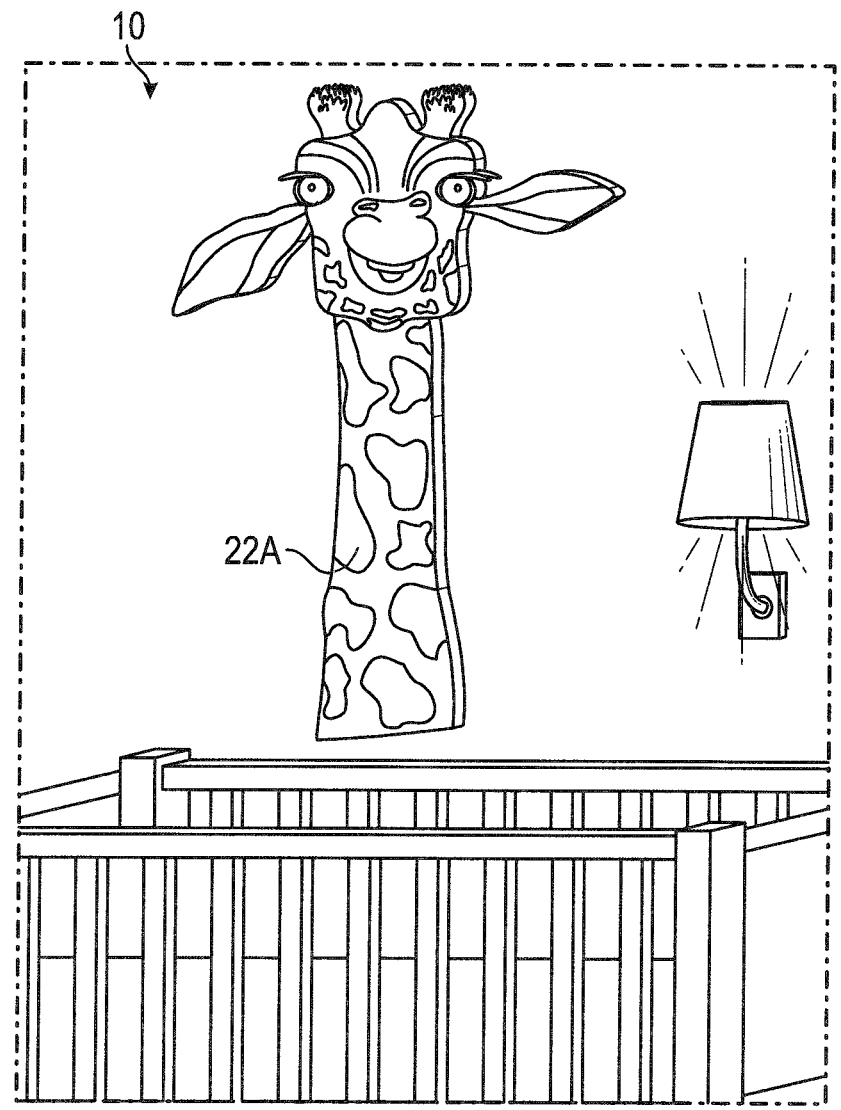
FIG. 1 is a diagram of an exemplary sticker according to one aspect of the present application.
Figure 2:
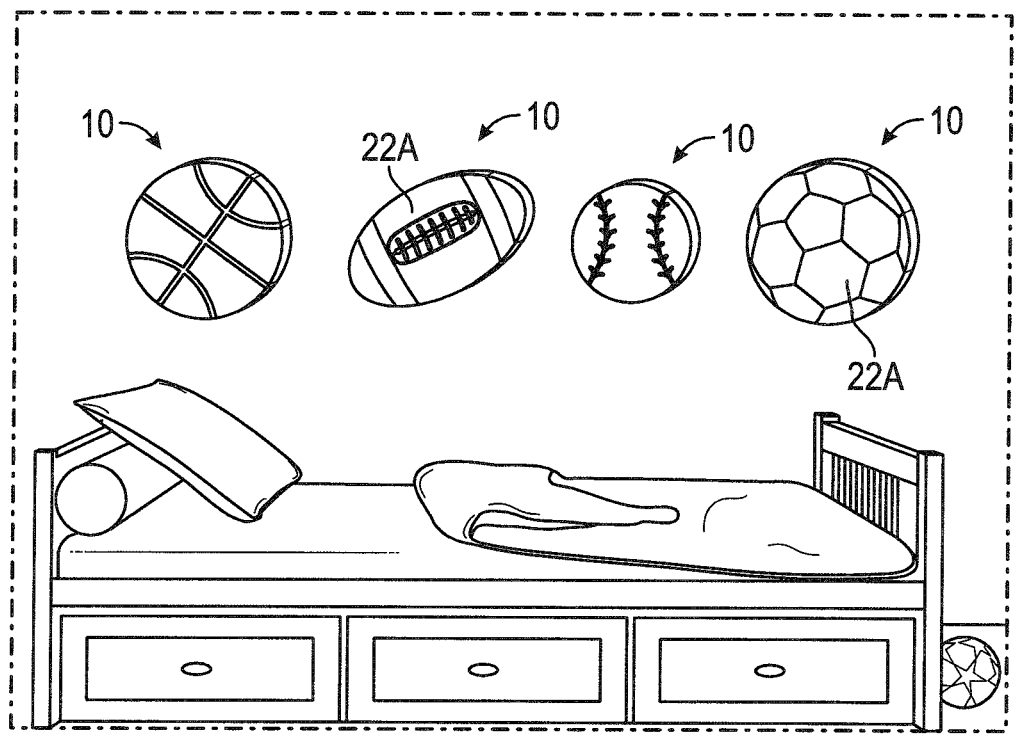
FIG. 2 is a diagram of an exemplary sticker according to one aspect of the present application.
Figure 3:
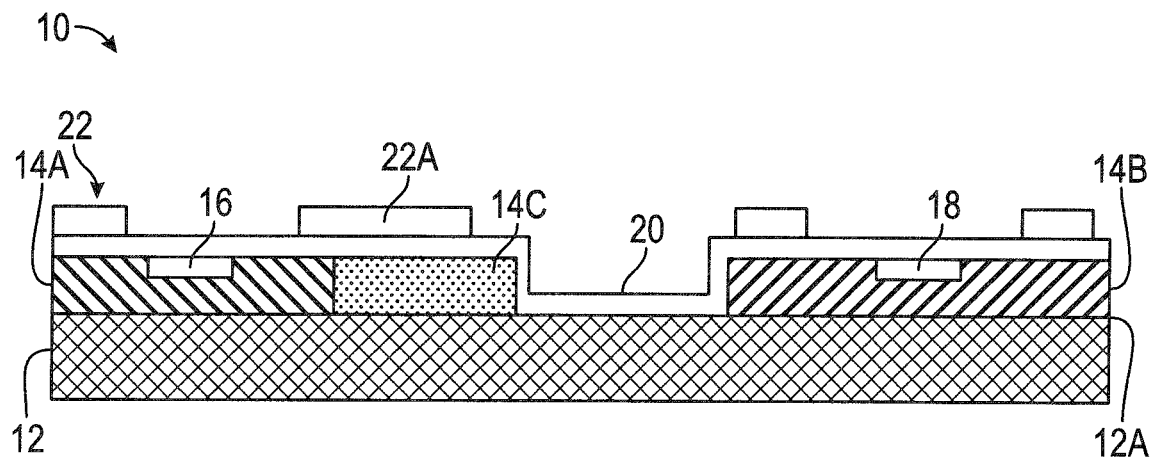
FIG. 3 is a cross sectional view of the sticker of depicted in FIG. 1 in accordance with one aspect of the present application.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary device relates to a reusable three dimensional (3D) sticker. The reusable three dimensional (3D) may be placed on a surface, such as a wall, and then removed and then reapplied on another and/or the same surface. The reusable three dimensional (3D) may have additional functionality and features not currently being used in conventional stickers.

Referring now to the FIGs., a reusable sticker 10 (hereinafter sticker 10) may be shown. The sticker 10 may display any suitable element and/or indicia that a user may desire to be display. For example, the sticker 10 may show display various sports equipment such as, but not limited to: baseballs, basketballs, soccer balls, hockey pucks, footballs, frisbees, or the like. The sticker 10 may show different animals such as, but not limited to: cats, dogs, horses, pigs, bears, lions, zebras, or the like. The sticker 10 may show nature themed products such as, but not limited to: rock outcroppings, tree limbs, or the like, sport figures, celebrities, fictional characters, and the like. The above are given as examples and should not be seen in a limiting manner. The sticker 10 may show other elements/objects without departing from the spirit and scope of the invention. The sticker 10 may display an actual representation of the above mentioned but may also be an abstract/cartoon representation.

The sticker 10 may have an adhering layer 12. The adhering layer 12 may be used to removably attach the sticker 10 to an object. The adhering layer 12 may be design to not leave any type of sticky residue when the sticker 10 is removed. The adhering layer 12 may be formed of an adhesive vinyl or similar material. The above is given as an example and should not be seen in a limiting manner. Other types of adhering material may be used without departing from the spirit and scope of the present invention.

A second layer 14 may be applied to an interior surface 12A of the adhering layer 12. The second layer 14 may have multiple functionality. In accordance with one embodiment, the second layer 14 may have a recording device 14A. The recording device 14A may allow the sticker 10 to play a message. The recording device 14A may have one or more pre-recorded messages and/or allow one to record a personalized message on the recording device. Alternatively, or in addition to, the recording device 14A may play pre-recorded and/or recorded music. The recording device 14A may have an activation mechanism 16. The activation mechanism 16 may allow one to play and/or record the pre-recorded message and/or the personalized message. In accordance with one embodiment, the activation mechanism 16 may be a push button device or similar mechanism.

In accordance with one embodiment, the second layer 14 may have a lighting element 14B. The lighting device 14B may allow the sticker 10 to illuminate all and/or portions of the sticker 10. The lighting element 14B maybe a stationary light, flashing light, rotating light or the like. The lighting device 14B may be controlled such that illumination may be controlled by a timer or by a light or motion sensor. Other control mechanism may be used to control the lighting device 14B than that disclosed above without departing from the spirit and scope of the present invention. In accordance with one embodiment, the control mechanism 18 may be a push button device or similar mechanism.

In accordance with one embodiment, the second layer 14 may have a filler material 14C. The filler material 14C may allow the sticker 10 to form a three dimensional configuration. The filler material 14C may be a foam material, pellets, or other types of materials. In accordance with one embodiment, the filler material 14C may be a gel type material. The gel material may be encased within a container to prevent the gel type material from leaking. The gel type material may have reflective material placed therein. The reflective material may be glitter like material of various sizes. The filler material 14C may allow one to touch and push the filler material 14C around a predefined area of the sticker 10.

A cover layer 20 may be applied over the interior surface 12A of the adhering layer 12. The cover layer 20 may be used to enclose the recording device 14A, lighting device 14B and/or the filler material 14C between the cover layer 18 and the interior surface 12A of the adhering layer 12. The cover layer 20 may be printed with a pattern or other indicia. The pattern or other indicia may serve as a decorative feature.

The cover layer 20 may be formed of the same material as the adhering layer 12. The cover layer 20 may be formed of an adhesive vinyl or similar material. The above is given as an example and should not be seen in a limiting manner. Other types of material may be used without departing from the spirit and scope of the present invention.

Attached to the cover layer 20 may be decorative layer 22. The decorative layer 22 may be used to provide additional functionality for the sticker 10. The decorative layer 22 may be used as a learning tool and help children improve finger dexterity. The decorative layer 22 may include fabric panels 22A. The fabric panels 22A may be glued, sewn or attached to the cover layer 20 in other manners. As an example, as shown in FIG. 1, the spots of the giraffe may be fabric panels 22A which may allow the sticker 10 to have a more lifelike feel of a giraffe. Thus, the fabric panels 22A may be simulated fur or the like. The fabric panels 22A may have one or more strings 30 of various lengths. One or more of the strings 30 may have beads 32 slidable along the string 30. This may allow children to grab and move the beads 32 to help the child develop finger dexterity.

In accordance with one embodiment, the fabric panels 22A may be a glow in the dark material. This may allow sections of the sticker 10 to illuminate when the area where the sticker 10 is applied is of sufficient darkness.

Figure 4:
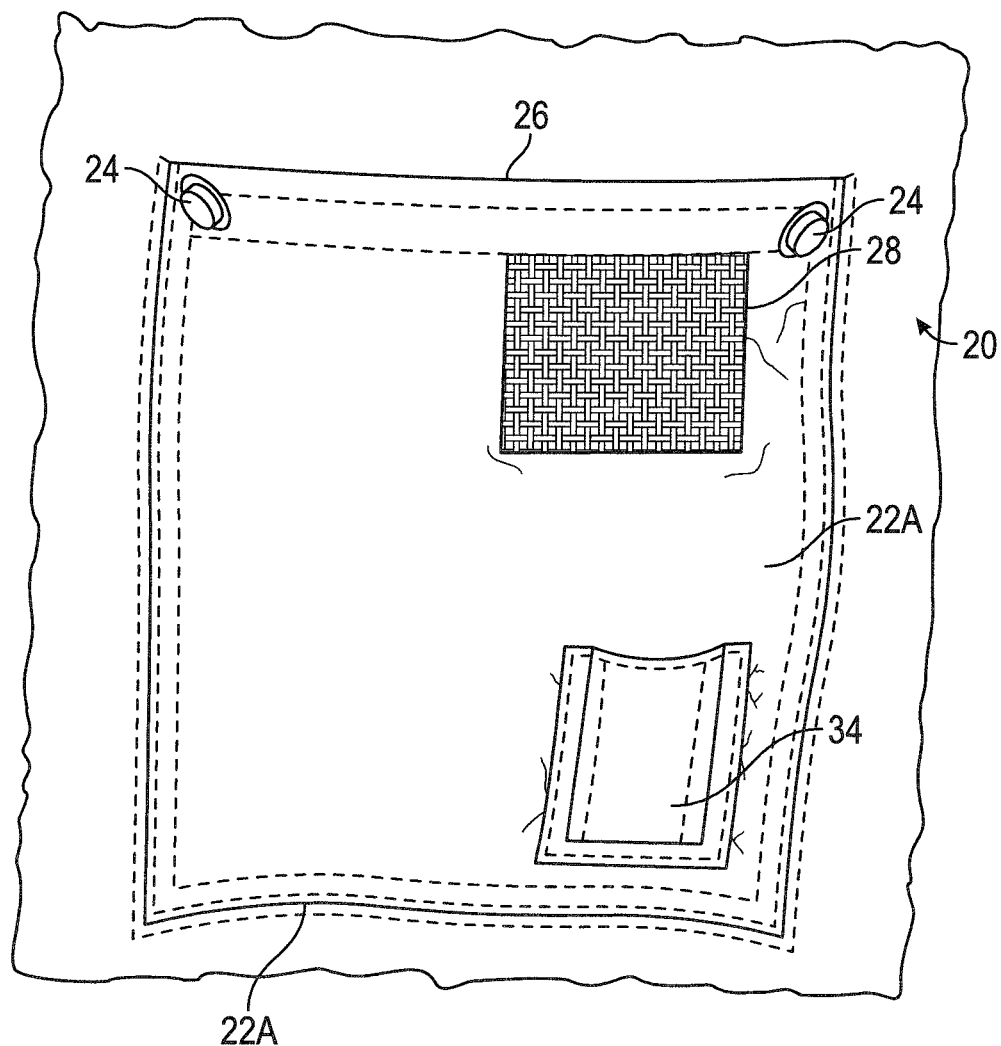
FIG. 4 is a magnified view of a decorative layer of an exemplary sticker according to one aspect of the present application.
Figure 5:
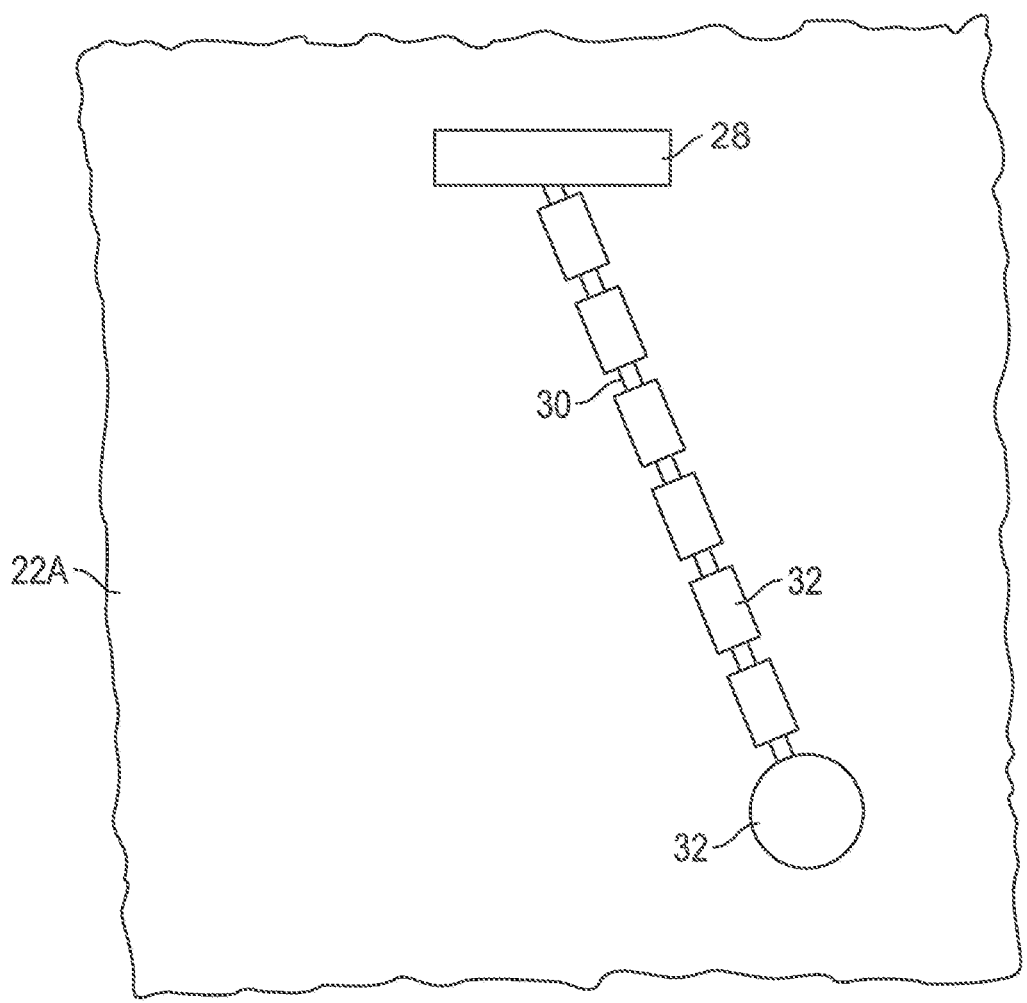
FIG. 5 is a magnified view of a decorative layer of an exemplary sticker according to one aspect of the present application.

In accordance with one embodiment, the fabric panels 22A may be attached to the cover layer 20 to form a pocket 24. The pocket may allow the sticker 10 to hold and store items. Alternatively, or in addition to, the fabric panel 22A may be detachable so to flip up or open similar to a door. The fabric panel 22A may flip up or open to display an object/drawing formed and/or attached to the cover layer 20. As may be seen in FIG. 4, the fabric panel 22A may have connectors 24. By removing the connectors 24, the fabric panel 22A may be opened to display object/drawing formed and/or attached to the cover layer 20.

In accordance with one embodiment, the fabric panels 22A may have a zipper 26 or other sliding mechanism. This may allow children to grab and move the zipper 26 to open/close the fabric panel 22A connected to cover layer 20. This may help the child develop finger dexterity.

In accordance with one embodiment, the fabric panels 22A may have hook and loop material 28 or safe hooks. This may allow one to attach and/or hang different items 34 to the sticker 10.

In accordance with one embodiment, the fabric panels 22A may be formed of a smart material. The smart material may be configured to change from one color to another based on temperature, moisture, pressure and/or other stimuli. In accordance with one embodiment, the fabric panels 22A may be formed of a thermochromic material.

In accordance with one embodiment, the fabric panels 22A may be infused with different fragrances. For example, the fabric panels 22A may be configured into a shape of a strawberry and infused with a strawberry fragrance. The fabric panels 22A may be infused with different fragrances that naturally emanate from the fabric panel 22A. Alternatively, the fabric panel 22A may be infused with different fragrances wherein a user may have to scratch/rub the fabric panels 22A before the different fragrances emanate from the fabric panel 22A. In accordance with one embodiment, the sticker 10 may be configures such that the fabric panel 22A secures a spray dispenser to the sticker 10 that may dispense the fragrance.

In accordance with one embodiment, the sticker 10 may be configures and formed of material that may allow a user to remove the sticker from a surface and place sticker 10 within a clear plastic zip pouch on child's shirt to wear.

The foregoing description is illustrative of particular embodiments of the invention, but is not meant to be a limitation upon the practice thereof. The following claims, including all equivalents thereof, are intended to define the scope of the invention.

What is claimed is:

1. A three-dimensional sticker comprising:
   an adhering layer removably attaching the three-dimensional sticker to an object;
   a filler material positioned on an interior surface of the adhering layer, the filler material forming a three-dimensional configuration;

a recording device positioned on the interior surface of the adhering layer allowing the three-dimensional sticker to play a pre-recorded message and record a new message; and a cover layer positioned over the interior surface of the adhering layer enclosing the filler material and the recording device between the interior surface of the adhering layer and the cover layer.

2. The three-dimensional sticker in accordance with claim 1, comprising a lighting device enclosed between the interior surface of the adhering layer and the cover layer.

3. The three-dimensional sticker in accordance with claim 1, comprising a decorative layer formed on the cover layer.

4. The three-dimensional sticker in accordance with claim 3, wherein the decorative layer formed on the cover layer comprises fabric panels formed on the cover layer.

5. The three-dimensional sticker in accordance with claim 3, wherein the decorative layer formed on the cover layer comprises fabric panels formed on the cover layer, the fabric panels having a plurality of strings attached thereto.

6. The three-dimensional sticker in accordance with claim 5, comprising a plurality of beads slidable on each of the plurality of strings attached thereto.

7. The three-dimensional sticker in accordance with claim 3, wherein the decorative layer formed on the cover layer comprises fabric panels formed on the cover layer, the fabric panels forming at least one pocket.

8. The three-dimensional sticker in accordance with claim 3, wherein the decorative layer formed on the cover layer comprises fabric panels formed on the cover layer, the fabric panels forming a flap which is moved to display an object.

9. The three-dimensional sticker in accordance with claim 3, wherein the decorative layer formed on the cover layer comprises:
   fabric panels formed on the cover layer; and
   a sliding device formed on at least one of the fabric panels.

10. The three-dimensional sticker in accordance with claim 3, wherein the decorative layer formed on the cover layer comprises:
    fabric panels formed on the cover layer; and
    an attachment device formed on at least one of the fabric panels coupling an item to the fabric panel.

11. The three-dimensional sticker in accordance with claim 3, wherein the decorative layer formed on the cover layer comprises thermochromic fabric panels formed on the cover layer.

12. A three-dimensional sticker comprising:
    an adhering layer removably attaching the three-dimensional sticker to an object;
    a filler material positioned on an interior surface of the adhering layer, the filler material forming a three-dimensional configuration;
    a recording device positioned on the interior surface of the adhering layer allowing the three-dimensional sticker to play a pre-recorded message and record a new message;
    a lighting device positioned on the interior surface of the adhering layer;
    a cover layer positioned over the interior surface of the adhering layer enclosing the filler material, the recording device and the lighting device between the interior surface of the adhering layer and the cover layer; and
    a decorative layer formed on the cover layer.

13. The three-dimensional sticker in accordance with claim 12, wherein the decorative layer formed on the cover layer comprises fabric panels formed on the cover layer.

14. The three-dimensional sticker in accordance with claim 12, wherein the decorative layer formed on the cover layer comprises fabric panels formed on the cover layer, the fabric panels having a plurality of strings attached thereto.

15. The three-dimensional sticker in accordance with claim 14, comprising a plurality of beads slidable on each of the plurality of strings attached thereto.

16. The three-dimensional sticker in accordance with claim 12, wherein the decorative layer formed on the cover layer comprises fabric panels formed on the cover layer, the fabric panels forming at least one pocket.

17. The three-dimensional sticker in accordance with claim 12, wherein the decorative layer formed on the cover layer comprises fabric panels formed on the cover layer, the fabric panels forming a flap which is moved to display an object.

18. The three-dimensional sticker in accordance with claim 12, wherein the decorative layer formed on the cover layer comprises:
    fabric panels formed on the cover layer; and
    a sliding device formed on at least one of the fabric panels.

19. The three-dimensional sticker in accordance with claim 12, wherein the decorative layer formed on the cover layer comprises:
    fabric panels formed on the cover layer; and
    an attachment device formed on at least one of the fabric panels coupling an item to the fabric panel.

20. The three-dimensional sticker in accordance with claim 12, wherein the decorative layer formed on the cover layer comprises thermochromic fabric panels formed on the cover layer.

* * * * *